# 2,966,109

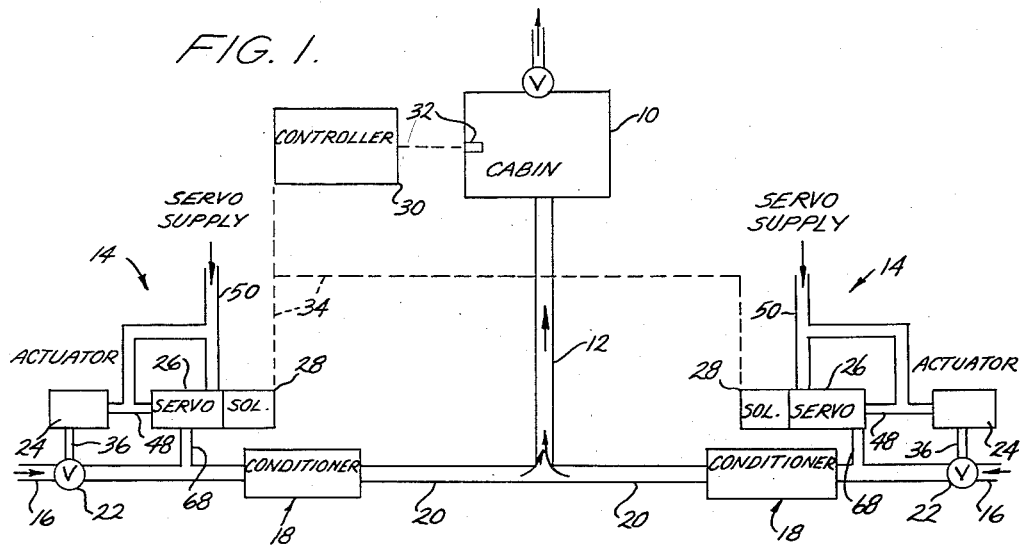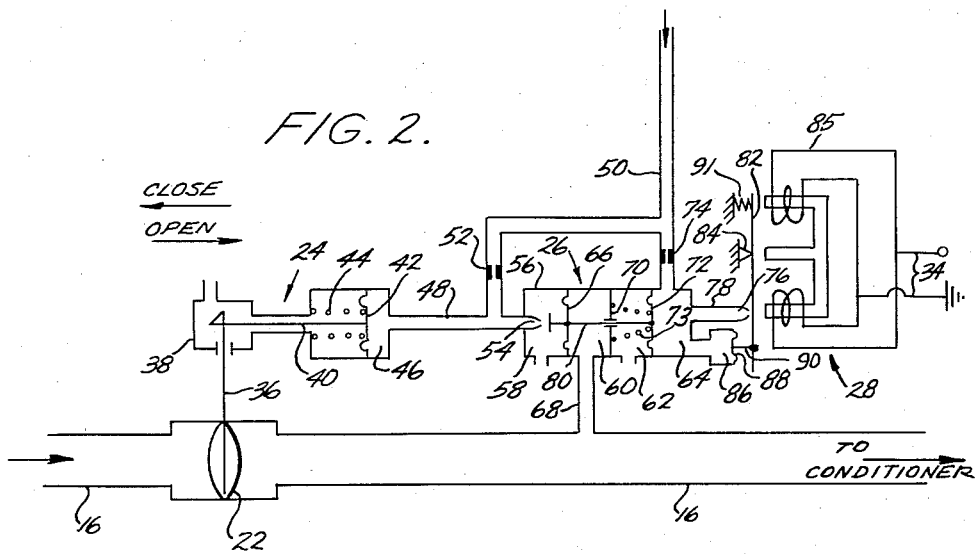

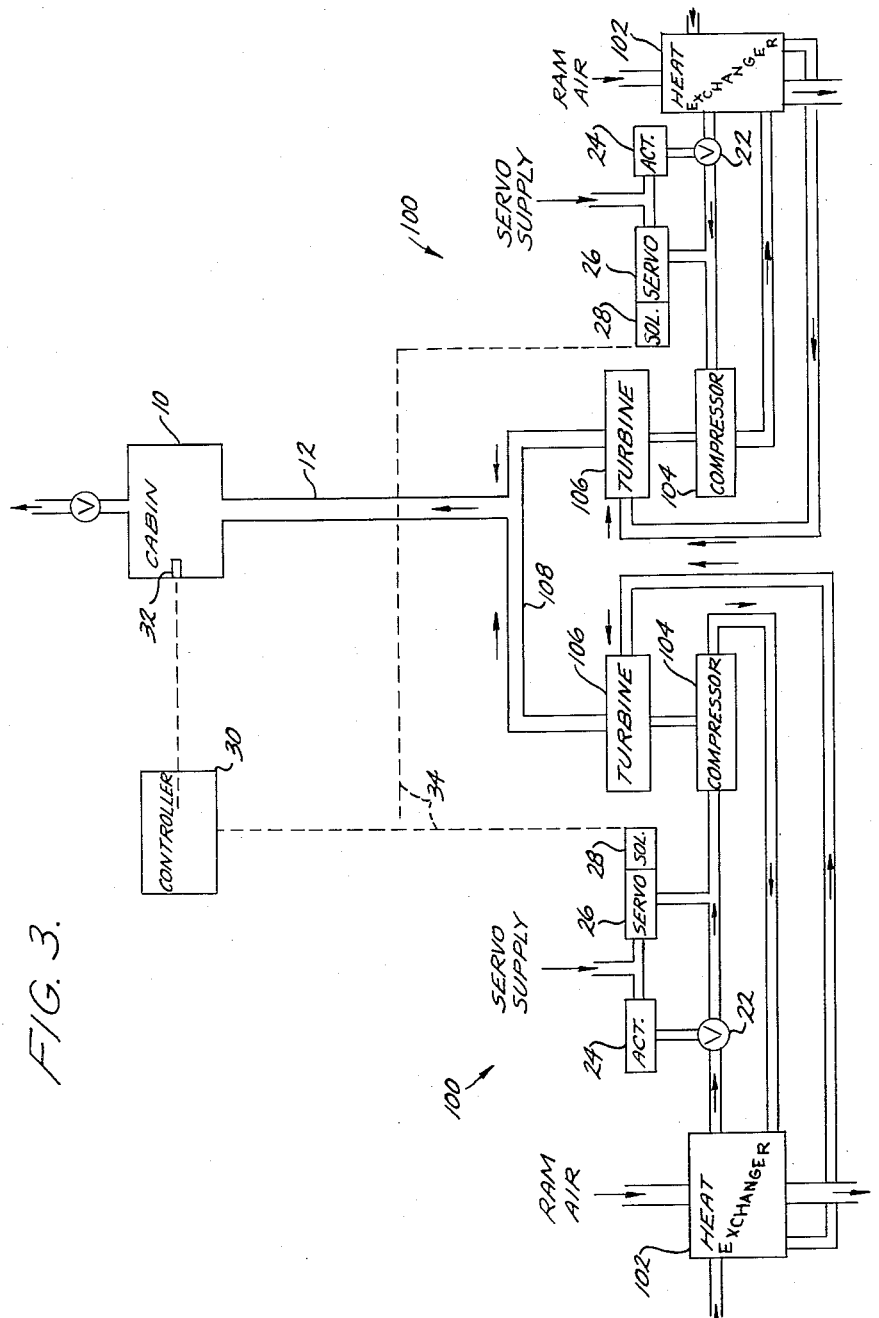

DUAL SUPPLY AIR CONDITIONING SYSTEM HAVING VALVE MEANS FOR EQUALIZING THE SUPPLY FLOW

Stanley G. Best, Manchester, Conn., assignor to United Aircraft Corporation, East Hartford, Conn., a corporation of Delaware Filed Apr. 29, 1957, Ser. No. 655,664

14 Claims. (Cl. 98—1.5)

This invention relates to an aircraft air conditioning system and, more specifically, to a composite air conditioning system having a plurality of distinct and independent supply systems and incorporating automatically operable means for controlling and equalizing flow from the supply systems.

It is the general object of the invention to provide an aircraft air conditioning system of the aforedescribed type which is adapted to utilize simultaneously a compressed air supply from a plurality of independent sources where the supply pressures may differ substantially and which operates automatically to equalize flow in the system from the two sources.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings,

Fig. 1 is a schematic illustration of a first embodiment of a composite air conditioning system provided in accordance with the present invention;

Fig. 2 is an enlarged schematic illustration of the flow control valve, its actuator and the elements associated therewith in the air conditioning system shown in Fig. 1; and Fig. 3 is a schematic view of a second embodiment or alternative air conditioning system provided in accordance with this invention.

The aircraft air conditioning system shown in Fig. 1 is adapted to utilize at least two independent sources of supply to provide the aircraft cabin or other compartments thereof with air at controlled pressure and/or temperature. While each source of supply is connected with independent pressure and/or temperature conditioning means to constitute an independent supply system, it is preferred that the two supply systems operate simultaneously to provide equal flow to the cabin. It may be desirable to have equal flow from the independent supply systems for various reasons. For example, the temperature conditioning means in each supply system may include a water boiler (a heat exchanger wherein water is boiled by the hot supply air) and it may be desirable to equalize flow to the water boilers so that the water supply in the boilers will be exhausted at substantially the same time.

Referring now in greater detail to the composite air conditioning system shown in Fig. 1, it will be observed that the aircraft cabin 10 has an air inlet conduit 12 which is connected with two independent air supply systems indicated generally at 14, 14. Each supply system 14 includes an inlet conduit 16 which may be connected with a suitable source of air under pressure, as for example, the compressor of an aircraft engine. Preferably, the inlet conduits 16, 16 of the supply systems 14, 14 are respectively connected with the compressors of two of the aircraft engines. The inlet conduit 16 in each supply system 14 is connected with air conditioning apparatus indicated schematically at 18 which cools the hot compressed air from the aircraft engine before discharging in a conduit 20 which is connected with the cabin air inlet conduit 12. Each unit of air conditioning apparatus 18 may include an air-to-air heat exchanger, a turbine, and a water boiler type heat exchanger or any other conventional air conditioning components in any desired combination. In any event, it is desirable to equalize the flow at the conduits 20, 20 from each supply system to the cabin air inlet conduit 12.

Obviously, the air conditioning units 18, 18 may be identical and the resistance to flow in the conduits 16, 16 and in the conduits 20, 20 may be the same for each supply system, so that unequal flow in the conduits 20, 20 can be traced directly to unequal supply pressures introduced to the systems. In accordance with the present invention, substantially equal flow from the two supply systems 14, 14 is established by providing a valve 22 in each system and control means therefor which will establish a pressure on the downstream side of one valve equal to the pressure on the downstream side of the similar valve in the other system. The valves 22, 22 in the supply systems 14, 14 can be located in any desired place in the conduits 16, 16 or in the conduits 20, 20, but preferably the valves 22, 22 are located in the conduits 16, 16 on the upstream side of the air conditioning units 18, 18.

The control means for each valve 22 includes a fluid pressure responsive valve actuator 24, a fluid pressure responsive servo unit 26 which controls pressure in the valve actuator 24, a solenoid operated mechanism 28 which influences the fluid pressure in the servo unit 26, and an electrical control unit 30 which controls the electrical signal to the solenoid operated mechanism 28. As shown in Fig. 1, the control unit 30 includes a temperature and/or pressure sensitive element 32 located in the aircraft cabin 10 and electrically and/or pneumatically connected with the controller 30 and the controller is electrically connected as indicated at 34 to the two solenoid mechanisms 28, 28. The construction of the electrical controller 30 and the temperature and/or pressure sensitive element 32 are conventional and in fact there are many commercially available devices for generating a selected electrical signal responsive to temperature and/or pressure or to changes therein. For this reason, and because the details of the electrical controller are of no importance to an understanding of the present invention, the electrical signal control devices have not been shown in detail.

As best shown in Fig. 2, the valve 22 in each supply system 14 is a throttle valve, a butterfly type valve being shown for purpose of illustration. The valve 22 has a shaft 36 extending into the housing 38 of the actuator 24 and within the said housing it is connected with an actuator piston 40. Considerable variation is permitted in the type of connection between the valve shaft 36 and the piston 40, a rack and pinion connection and a slotted link and pin connection being examples which may be employed. There can also be variations in the type of actuator piston 40 employed, the diaphragm type shown being merely an example. In the exemplary actuator piston, the diaphragm 42 is urged in one direction within the actuator housing 38 by a spring 44 and it is urged in the opposite direction by fluid under pressure in a chamber 46 defined within the actuator housing 38. As shown, the spring 44 urges the actuator piston 40 in one direction to open the valve 22 in the conduit 16 and it is moved in the opposite direction to close the valve 22 responsive to fluid pressure in the chamber 46.

A conduit 48 is connected between the valve actuator 24 and the servo unit 26 and it is also connected with a conduit 50 receiving fluid at a substantially constant pressure from a suitable source (not shown). The fluid introduced to each supply system 14 through the conduit 50 is a servo supply which operates the valve actuator 24 and, accordingly, the conduit 50 will hereinafter be referred to as the servo supply conduit. It will be observed that a restriction 52 is provided in the connection between the servo supply conduit 50 and the valve actuator supply conduit 48 whereby the fluid pressure within the valve actuator conduit 48 may be varied by opening and closing or by changing the effective area of an orifice such as the orifice 54 in the end of the conduit 48 which is disposed within the housing 56 of the servo unit 26.

The servo unit 26 may take any desired form to provide an armature or valve movable relative to the actuator control orifice 54 responsive to fluid pressure in the said servo unit. In the presently preferred form, the housing 56 is divided into four chambers; end chamber 58, a first intermediate chamber 60, a second intermediate chamber 62 and another end chamber 64. The first end chamber 58 receives the end of the valve actuator conduit 48 having the orifice 54 and the chamber 58 is vented to atmosphere. The said first end chamber 58 is defined between an end wall of the housing 56 and a diaphragm 66 disposed transversely therein. The first intermediate chamber 60 is connected by a conduit or passageway 68 with the air conditioning system supply conduit 16 on the downstream side of the throttle valve 22. The said first intermediate chamber 60 is defined between the diaphragm 66 and a rigid transverse partition 70 in the housing 56. The second intermediate chamber 62 is vented to atmosphere and is defined between the partition 70 and a second transversely disposed diapragm 72. This chamber may hereinafter be referred to as a spring chamber in that a spring 73 is seated on the partition 70 to bear against the diaphragm 72. The second or other end chamber 64 is connected with the servo supply conduit 50, the said connection being provided with a restriction 74. The fluid pressure in the end chamber 64, which will hereinafter be referred to as the servo chamber, is controlled at an orifice 76 in the end of a conduit 78 extending from the said servo chamber.

In the presently preferred form of the servo unit 26, an axially movable armature or valve 80 is utilized to open and to close and to control the effective opening at the valve actuator control orifice 54. As shown in Fig. 2, the valve 80 is slidable in sealed relationship in the rigid transverse partition 70 and it is connected with the diapragms 66 and 72 for movement therewith. Since the valve 80 is connected to the diaphragms 66 and 72, it is urged toward the orifice 54 to close the same responsive to fluid pressure in the intermediate chamber 60 equal to the downstream pressure in the supply conduit 16, and the valve 80 is urged toward orifice closing position by the fluid pressure in the servo chamber 64. The valve 80 is urged away from the orifice 54 or in the orifice opening direction by the spring 73 in the spring chamber 62. Obviously, the spring force acting on the valve can be adjusted by providing a spring (not shown) of adjustable force in the servo chamber 64 to oppose the spring 73 on the diaphagm 72. Thus, it will be seen that the relative opening of the throttle valve actuator control orifice 54 is controlled responsive to the servo pressure in the servo unit 26 coordinated with the fluid pressure in the system supply conduit 16 downstream of the throttle valve 22.

The servo pressure in the chamber 64 is controlled and varied at the orifice 76 by the solenoid operated mechanism 28. The said solenoid operated mechanism includes an armature 82 which is pivoted between its ends as indicated at 84. The pivoting movement of the armature 82 is influenced by a solenoid coil 85 connected by the conductors 34 to the temperature and/or pressure responsive signal generator 30. When the armature 82 is pivoted, it is moved relative to the orifice 76 to control the effective opening thereof. Preferably, the solenoid is of the type which has become known as a "proportional solenoid" which will exert an output force on the armature 82 corresponding to a known signal from the electrical control unit 30.

A pressure feed-back is provided between the servo unit 26 and the solenoid operated mechanism 28. The feed-back comprises a chamber 86 in communication with the servo chamber 64 to provide servo pressure on a feed-back diaphragm 88 which is connected by a link 90 to the armature 82. The feed-back co-operates with the control signal generator 30 and the solenoid mechanism 28 to provide a known bias pressure in the chamber 64 in response to a known signal from the electrical control unit 30. The force exerted by the link 90 on the armature 82 acts in opposition to and balances the force exerted by the solenoid mechanism 28 on the armature 82. Any force unbalance will result in an adjustment of the opening of the orifice 76 and a resulting pressure change in the chambers 64 and 68 in the proper direction to restore a balanced condition. Thus, if the signal from the control signal generator 30 is altered, the force exerted on the armature 82 by the solenoid mechanism 28 will be correspondingly altered, as will the opening at the orifice 76, the pressures in chambers 64 and 86 and the feed-back force exerted by the link 90.

Variation in servo supply pressure in the conduit 50 and/or clogging of the restriction 74 or the orifice 76 will not effect a changed pressure condition in chamber 64. In the event that any of these extraneous effects take place, the feed-back mechanism will automatically adjust the position of the armature 82 to maintain a constant biasing pressure in the chamber 64 as long as solenoid force on the armature 82 remains constant.

The utility of the throttle valve 22 for each supply system 14 will probably be apparent from the foregoing description of the elements thereof. However, the less apparent purpose of providing two such throttle valves, one for each of the supply systems 14, 14, will be more readily understood by considering briefly the overall operation of the composite air conditioning system.

Assume for example, that the left-hand supply system 14 shown in Fig. 1 is connected with an engine compressor delivering a supply at a substantially greater pressure than the supply delivered to the right-hand system 14. Such being the case, and if the throttle valve 22 in the respective supply systems were both set in the same rotated position in the respective conduits 16, 16, there would be more flow in the left-hand conduit 20 to the cabin inlet conduit than there would be in the right-hand conduit 20 to the cabin inlet conduit. However, the valves 22, 22 in accordance with the present invention will not be similarly positioned in the conduits 16, 16 when the supply pressure to the said conduits differs. That is, the relatively great supply pressure in the left-hand conduit 16 will be reflected in relatively great pressure in the first intermediate chamber 60 of the left-hand servo unit 26. This fluid pressure acting upon the diaphragm 66 will cause the servo valve 80 to be shifted toward the valve actuator control orifice 54 to reduce the effective opening of that orifice. This causes increased fluid pressure in the actuator chamber 46 of the left-hand valve actuator 24 which causes the left-hand throttle valve 22 to be moved toward closed position. When the said left-hand throttle valve 22 is moved toward closed position, there will be an increased drop across it, thus reducing the pressure and flow on the downstream side of the said valve.

If the conduits in the two supply systems are of equal size and if the throttle valves and associated apparatus in the respective supply systems are identical, they will operate automatically to provide substantially equal pressure on the downstream sides of the respective throttle valves, and thus flow from the respective supply systems will be substantially equal. That is, the same electrical signal is provided to both the solenoid units for the respective throttle valves, thus providing the same solenoid output force. In each servo unit, the conduit pressure downstream of the respective throttle valve is compared to the signal generated force and the throttle valve is re-positioned until the comparison results in a force balance. When force balance is achieved in both supply systems, the flow therefrom is substantially equal.

The throttle valves 22, 22 are re-positioned simultaneously by the temperature and/or pressure responsive electrical control unit 30. That is, if the temperature and/or pressure sensitive element 32 within the aircraft cabin senses a temperature and/or pressure change, a signal is generated in the control 30 and transmitted to both solenoid mechanisms 28, 28 in the supply systems 14, 14 to change the servo pressure a substantially equal amount in the servo chambers 64, 64 of the respective servo units 26, 26. Thus a substantially equal adjustment is made in the position of the throttle valves 22, 22 when an adjustment is required to correct cabin temperature or pressure conditions.

The use of the throttle valve and throttle valve control means described is not limited to the air conditioning system shown in Fig. 1. The valve and valve control means can be used to equal advantage in many other composite systems including the system shown in Fig. 3. The air conditioning system of Fig. 3 is similar to the system shown in Fig. 1 in that an aircraft cabin 10 is supplied with conditioned air through an inlet conduit 12 which is supplied from two systems indicated generally by the reference numerals 100, 100. Each supply system 100 includes a throttle valve 22, a valve actuator 24, a servo unit 26, and a solenoid unit 28. In addition, the electrical signal to the solenoid units 28, 28 is controlled by the unit 30 as in the first described embodiment. The supply systems 100, 100 differ from the previously described supply systems 14, 14 in that each system 100 includes a heat exchanger 102 connected between the system inlet and the throttle valve 22. In addition, each supply system 100 includes a turbine driven compressor 104 receiving air from the heat exchanger 102 after it has passed the throttle valve 22 and the compressor 104 discharges the air back into the heat exchanger 102 for further cooling. The air leaving the heat exchanger 102 in its final pass therethrough is directed to a turbine 106 as the propellant therefor. The turbine 106 is used to drive the compressor and the propelling air is cooled in expanding through the turbine. Upon discharge from the turbine, the air is directed through a conduit 108 into the cabin inlet conduit 12.

The construction and operation of the throttle valve 22 and the construction and operation of the control means associated therewith in each supply system 100 are the same as in the previously described air conditioning system. While the throttle valve 22 has been shown on the upstream side of the compressor 104, it can be located on the downstream side thereof as, for example, between the heat exchanger 102 and the turbine 106. Various other alternative locations for the throttle valve 22 in each of the dual supply systems can be permitted within the scope of the present invention and the invention embraces various other composite air conditioning systems than are shown in Figs. 1 and 3.

The invention claimed is:

1. A composite air conditioning system for a compartment and comprising a plurality of supply systems each of which includes a supply conduit and each of which is connectible with the compartment, a throttle valve disposed in each supply conduit to control downstream pressure therein, and control means for each throttle valve comprising a pressure responsive valve actuator having a pressure chamber connectible with a source of fluid under pressure and provided with a pressure controlling orifice, a control valve for said orifice, solenoid operated means for moving said control valve including an electrical signal generator responsive to air conditions in said compartment for providing a known force on said control valve, means defining an air chamber connected with the associated supply conduit downstream of the throttle valve, and means responsive to pressure in said air chamber connected with said control valve to adjust the position thereof to a position of balance between the forces of the solenoid operated means and the pressure in said air chamber.

2. A composite air conditioning system for an aircraft compartment comprising two supply systems each of which includes a supply conduit connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, a pressure responsive servo unit including a valve reciprocal with respect to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve in one direction, means biasing said servo valve in the opposite direction, an armature movable with respect to the servo orifice to vary the effective opening thereof, and means responsive to the air condition within said compartment for moving the said armature.

3. A composite air conditioning system for an aircraft compartment comprising two supply systems each of which includes a supply conduit connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, a pressure responsive servo unit including a valve reciprocable with respect to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve in one direction, means biasing said servo valve in the opposite direction, an armature movable with respect to the servo orifice to vary the effective opening thereof, and solenoid operated means for moving the said armature relative to the servo orifice, the said solenoid operated means being responsive to the air condition within the compartment.

4. A composite air conditioning system for an aircraft compartment comprising two supply systems each of which includes a supply conduit connected with the compartment and connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, the said pressure chamber being arranged to provide fluid pressure for closing the throttle valve, means biasing said throttle valve toward open position, a pressure responsive servo unit including a valve reciprocable relative to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve to close the actuator orifice, means biasing said servo valve to open the actuator orifice, an armature movable with respect to the servo orifice to vary the effective opening thereof, and means responsive to the air condition within said compartment for moving said armature.

5. A composite air conditioning system for an aircraft compartment comprising two supply systems each of which includes a supply conduit connected with the compartment and connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, the said pressure chamber being arranged to provide fluid pressure for closing the throttle valve, means biasing said throttle valve toward open position, a pressure responsive servo unit including a valve reciprocable relative to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve to close the actuator orifice, means biasing said servo valve to open the actuator orifice, an armature movable with respect to the servo orifice to vary the effective opening thereof, and solenoid operated means for moving the armature to vary the effective opening of the servo orifice, the said solenoid operated means being responsive to the air condition within said compartment.

6. A composite air conditioning system for an aircraft compartment comprising two supply systems each of which includes a supply conduit connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, a pressure responsive servo unit including a valve reciprocable with respect to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve in one direction, means biasing said servo valve in the opposite direction, an armature movable with respect to the servo orifice to vary the effective opening thereof, means responsive to increased temperature within said compartment for moving said armature in one direction with respect to the servo orifice, and means responsive to pressure in said servo chamber for moving said armature in the opposite direction.

7. A composite air conditioning system for an aircraft compartment comprising two supply systems each of which includes a supply conduit connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, a pressure responsive servo unit including a valve reciprocable with respect to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve in one direction, means biasing said servo valve in the opposite direction, an armature movable with respect to the servo orifice to vary the effective opening thereof, means responsive to increased pressure within said compartment for moving said armature in one direction with respect to the servo orifice, and means responsive to pressure in said servo chamber for moving said armature in the opposite direction.

8. A composite air conditioning system for an aircraft compartment comprising two supply systems each of which includes a supply conduit connected with the compartment and connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, the said pressure chamber being arranged to provide fluid pressure for closing the throttle valve, means biasing said throttle valve toward open position, a pressure responsive servo unit including a valve reciprocable relative to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve to close the actuator orifice, means biasing said servo valve to open the actuator orifice, an armature movable with respect to the servo orifice to vary the effective opening thereof, means responsive to increased temperature within said compartment for moving said armature to reduce the effective opening of the servo orifice, and means responsive to pressure in said servo chamber for moving said armature to increase the effective opening of the said servo orifice.

9. A composite air conditioning system for an aircraft compartment comprising two supply systems each of which includes a supply conduit connected with the compartment and connectible with an independent source of air under pressure, a throttle valve disposed in each supply conduit to control downstream pressure therein, and control means for each throttle valve comprising a pressure responsive valve actuator having a pressure chamber connectible with a source of fluid under pressure and provided with a pressure controlling discharge orifice, the said pressure chamber being arranged to provide fluid pressure for closing the throttle valve, means biasing said throttle valve toward open position, a pressure responsive servo unit including a valve reciprocable relative to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve to close the actuator orifice, means biasing said servo valve to open the actuator orifice, an armature movable with respect to the servo orifice to vary the effective opening thereof, solenoid operated means responsive to temperature increase within said compartment for moving the said armature to reduce the effective opening of said servo orifice and responsive to temperature decrease within said compartment for moving the armature to increase the effective opening of the said servo orifice, and means responsive to increased pressure within said servo chamber for moving said armature to increase the effective opening of the said servo orifice and responsive to decreased pressure in said servo chamber for moving said armature to reduce the effective opening of the said servo orifice.

10. A composite air conditioning system for an aircraft compartment comprising two supply systems each of which includes a supply conduit connected with the compartment and connectible with an independent source of air under pressure and each of which includes means connected in said supply conduit for cooling the air supply therein, a throttle valve disposed in each supply conduit between the air supply source and the temperature conditioning means to control the air pressure in said conduit flowing to said temperature conditioning means, and control means for each throttle valve comprising a pressure responsive valve actuator having a pressure chamber connectible with a source of fluid under pressure and provided with a pressure controlling discharge orifice, a pressure responsive servo unit including a valve reciprocable with respect to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the sevo valve in one direction, means biasing said servo valve in the opposite direction, an armature movable with respect to the servo orifice to vary the effective opening thereof, and means responsive to the air condition within said compartment for moving the said armature.

11. Means for controlling flow in a supply conduit forming a part of an aircraft air conditioning system wherein the conduit is connected with an aircraft compartment and is also connectible with a source of air under variable pressure, the said flow control means comprising a throttle valve disposed in the supply conduit, and automatic control means for the throttle valve including a pressure responsive valve actuator having a pressure chamber connectible with a source of fluid under pressure and provided with a pressure controlling discharge orifice, a pressure responsive servo unit including a valve reciprocable with respect to the actuator orifice to control the effective opening thereof and also including a pair of chambers, one of which is connected with the supply conduit downstream of the throttle valve and the other of which is a servo chamber connectible with a source of fluid under pressure and having a discharge orifice for controlling servo pressure and both of which chambers are arranged to provide fluid pressure uging the servo valve in one direction, means biasing said servo valve in the opposite direction, an armature movable with respect to the servo orifice to vary the effective opening thereof, and means responsive to the air condition within said compartment for moving the said armature.

12. Means for controlling flow in a supply conduit forming a part of an aircraft air conditioning system wherein the conduit is connected with an aircraft compartment and is also connectible with a source of air under variable pressure, the said flow control means comprising a throttle valve disposed in the supply conduit to control downstream pressure therein, and control means for the throttle valve comprising a pressure responsive valve actuator having a pressure chamber connectible with a source of fluid under pressure and provided with a pressure controlling discharge orifice, the said actuator chamber being arranged to provide fluid pressure urging the actuator to close the throttle valve, means biasing said actuator to open the throttle valve a pressure responsive servo unit including a valve reciprocable with respect to the actuator orifice to control the effective opening thereof and also including a pair of chambers one of which is connected with the supply conduit downstream of the throttle valve and the other of which is a servo chamber connectible with a source of fluid under pressure and having a discharge orifice for controlling servo pressure and both of which chambers are arranged to provide fluid pressure urging the servo valve to close the actuator orifice, means biasing said servo valve to open the actuator orifice, an armature movable with respect to the servo orifice to vary the effective opening thereof, and means responsive to the air condition within said compartment for moving the said armature.

13. A composite air conditioning system for an aircraft compartment comprising a plurality of supply systems each of which includes a supply conduit connected with the aircraft compartment and connectible with a source of air under pressure, a plurality of throttle valves disposed respectively in said supply conduits, the respective locations of said throttle valves in said supply conduits being such that the resistances to flow in said conduits between said throttle valves and said aircraft compartment are substantially equal, control means for the several throttle valves adapted to receive a variable input signal and to adjust the position of the throttle valve automatically so that air pressures in said conduits adjacent the aircraft compartment on the downstream sides of said valves are varied in proportion to said input signal and are maintained substantially equal to each other, and signal generating means responsive to an air condition in said compartment connected with said valve control means and adapted to supply variable input signals thereto whereby to provide for variable but substantially equal pressures and flows in said several supply conduits downstream of said throttle valves.

14. A composite air conditioning system for an aircraft compartment comprising a plurality of supply systems each of which includes a supply conduit connected with the aircraft compartment and connectible with a source of air under pressure, a plurality of throttle valves disposed respectively in said supply conduits, the respective locations of said throttle valves in said supply conduits being such that the resistances to flow in said conduits between said throttle valves and said aircraft compartment are substantially equal, control means for each throttle valve comprising a pressure responsive valve actuator adapted to receive a variable input pressure signal and a pressure signal variable with valve downstream pressure and to adjust the position of the throttle valve automatically so as to regulate valve downstream pressure in proportion to said variable input pressure signal, said control means and throttle valves being constructed and arranged to provide for equal air pressures in said several conduits adjacent the aircraft compartment downstream of the throttle valves therein when input pressure signals to the valve actuators of the several control means are equal, and signal generating means responsive to an air condition in said compartment connected with each of said valve control means and adapted to supply variable but equal input pressure signals to said actuators whereby to provide for variable but substantially equal pressures and flows in said several supply conduits downstream of said throttle valves.

References Cited in the file of this patent

UNITED STATES PATENTS

| Re. 23,913 | Baak | Dec. 21, 1954 |
| 2,425,000 | Paget | Aug. 5, 1947 |
| 2,456,215 | Price | Dec. 14, 1948 |
| 2,496,862 | DelMar | Feb. 7, 1950 |
| 2,698,568 | Jensen | Jan. 4, 1955 |
| 2,723,615 | Morris et al. | Nov. 15, 1955 |
| 2,854,913 | Brahm | Oct. 7, 1958 |